United States Patent [19]

Maki et al.

[11] Patent Number: 4,939,981
[45] Date of Patent: Jul. 10, 1990

[54] HYDRAULIC SERVO CYLINDER DEVICE FOR CONTROLLING CONTINUOUSLY VARIABLE SPEED TRANSMISSION

[75] Inventors: Kazuya Maki, Aichi; Hideo Koyama; Takeo Suzuta, both of Saitama, all of Japan

[73] Assignee: Honda Giken Kogyo Kabushiki Kaisha, Tokyo, Japan

[21] Appl. No.: 259,784

[22] Filed: Oct. 19, 1988

[30] Foreign Application Priority Data

Oct. 22, 1987 [JP] Japan .................. 62-267437

[51] Int. Cl.5 ............................................. F01B 1/00
[52] U.S. Cl. ........................................ 91/166; 91/165; 91/390; 91/417 R
[58] Field of Search ...................... 91/24, 25, 26, 165, 91/166, 390, 416, 417 R, 235, 321; 92/162 P

[56] References Cited

U.S. PATENT DOCUMENTS

| | | | |
|---|---|---|---|
| 446,183 | 2/1891 | Hill | 92/162 P |
| 3,211,419 | 10/1965 | Klinger-Lohr . | |
| 3,212,358 | 10/1965 | Lalio . | |
| 3,543,514 | 12/1970 | Reimer . | |
| 3,568,570 | 3/1971 | Winders | 91/390 X |
| 3,631,766 | 1/1972 | Emmasingel | 92/162 P |
| 3,704,588 | 12/1972 | Trabbic | 60/53 R |
| 3,807,277 | 4/1974 | La Spisa et al. | 91/390 X |
| 4,102,131 | 7/1978 | Reynolds et al. | 60/431 |
| 4,256,017 | 3/1981 | Eastman | 91/417 R |
| 4,386,553 | 6/1983 | Thoman et al. | 91/361 |
| 4,494,800 | 1/1985 | Hayashi et al. | 303/6 A |
| 4,699,571 | 10/1987 | Bartholomaus | 417/213 |

FOREIGN PATENT DOCUMENTS

| | | |
|---|---|---|
| 56-95722 | 8/1981 | Japan . |
| 62-29420 | 2/1987 | Japan . |
| 62-127562 | 6/1987 | Japan . |

*Primary Examiner*—Robert E. Garrett
*Assistant Examiner*—Thomas Denion
*Attorney, Agent, or Firm*—Lyon & Lyon

[57] ABSTRACT

A hydraulic servo cylinder device for controlling a speed reduction ratio or clutch operation in a continuously variable transmission comprises cylinder and a piston slidably fitted in a cylinder chamber of the cylinder. The cylinder chamber is divided by the piston into a rod-side cylinder chamber and a head-side cylinder chamber, the rod-side cylinder chamber being supplied with a hydraulic line pressure, the head-side cylinder chamber being supplied with a hydraulic control pressure. When the piston is moved to a position near a head-side stroke end, the control pressure in the head-side cylinder chamber is so set that a hydraulic force which the piston receives from said control pressure is in equilibrium with a hydraulic force which the piston receives from the line pressure.

2 Claims, 3 Drawing Sheets

HYDRAULIC SERVO CYLINDER DEVICE FOR CONTROLLING CONTINUOUSLY VARIABLE SPEED TRANSMISSION

BACKGROUND OF THE INVENTION

The present invention relates to a hydraulic servo cylinder device for controlling a speed reduction ratio, clutch operation, etc., in a continuously variable speed transmission.

Various continuously variable speed transmission for continuously changing the speed of input rotation have heretofore been proposed for use on motor vehicles. For example, Japanese Laid-Open Patent Publication No. 56(1981)-95772 discloses a continuously variable speed transmission for use on a motor vehicle, inlcuding a closed circuit composed of a fixed-displacement hydraulic pump and variable-displacement hydraulic motor.

In such a continuously variable speed transmission, clutch control for starting or stopping the motor vehicle and speed reduction ratio control during running of the motor vehicle are carried out by a servo cylinder device based on the opening of the engine throttle valve, the vehicle speed, and other parameters. One well known type of such servo cylinder device comprises a cylinder with its interior divided into two cylinder chambers by a piston slidably fitted therein. A given line pressure is exerted in one of the cylinder chambers, whereas a hydraulic control pressure acts in the other cylinder chamber, the hydraulic control pressure being variably controlled to move the piston slidably in the cylinder chambers. According to one scheme, the piston is coupled to ratio varying means such as the swash plate of a swash-plate-type variable-displacement piston motor for controlling the speed reduction ratio dependent on the movement of the piston.

With the hydraulic servo cylinder device described above, when exerting the hydraulic control pressure in the other cylinder chamber while the line pressure is acting in one cylinder chamber, the piston does not move until the hydraulic control pressure builds up to a pressure level which counteracts the force that the piston receives from the line pressure. Therefore, if the hydraulic control pressure is initially zero, then the piston is operated with a response delay corresponding to a period of time required for the hydraulic control pressure in the other cylinder chamber to increase up to the above pressure level.

SUMMARY OF THE INVENTION

It is an object of the present invention to provide a hydraulic servo cylinder device in which a piston operates without a response delay.

To achieve the above object, a hydraulic servo cylinder device of the present invention has a rod-side cylinder chamber supplied with a hydraulic line pressure and a head-side cylinder chamber supplied with a hydraulic control pressure. When a piston is moved to a position near a head-side stroke end, the control pressure is so set that a hydraulic force which the piston receives from the control pressure in the head-side cylinder chamber is in equilibrium with a hydraulic force which the piston receives from the line pressure in the rod-side cylinder chamber.

With the hydraulic servo cylinder device of the above construction, when the control pressure is lowered to move the piston toward its head under the line pressure acting in the rod-side cylinder chamber until the piston reaches the position near the stroke end thereof, the control pressure in the head-side cylinder chamber is controlled such that the hydraulic force that the piston receives from the control pressure and the hydraulic force that the piston receives from the line pressure in the rod-side cylinder chamber are held in equilibrium. Thus, when the piston is positioned near the head-side stroke end, the forces acting to move the piston are balanced and the hydraulic pressure in the head-side cylinder chamber is maintained. Therefore, the control pressure is subsequently applied to the head-side cylinder chamber with a high responsiveness in moving the piston.

The wordings "accelerator opening" used in the specification and claims means an accelerator pedal opening operated dependent upon the driver's accelerating or decelerating intention or an engine throttle valve opening responsive to the operation of accelerator pedal. The accelerator opening is fully closed when the accelerator pedal is completely released and fully opened when it is completely depressed.

Further scope of applicability of the present invention will become apparent from the detailed description given hereinafter. However, it should be understod that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
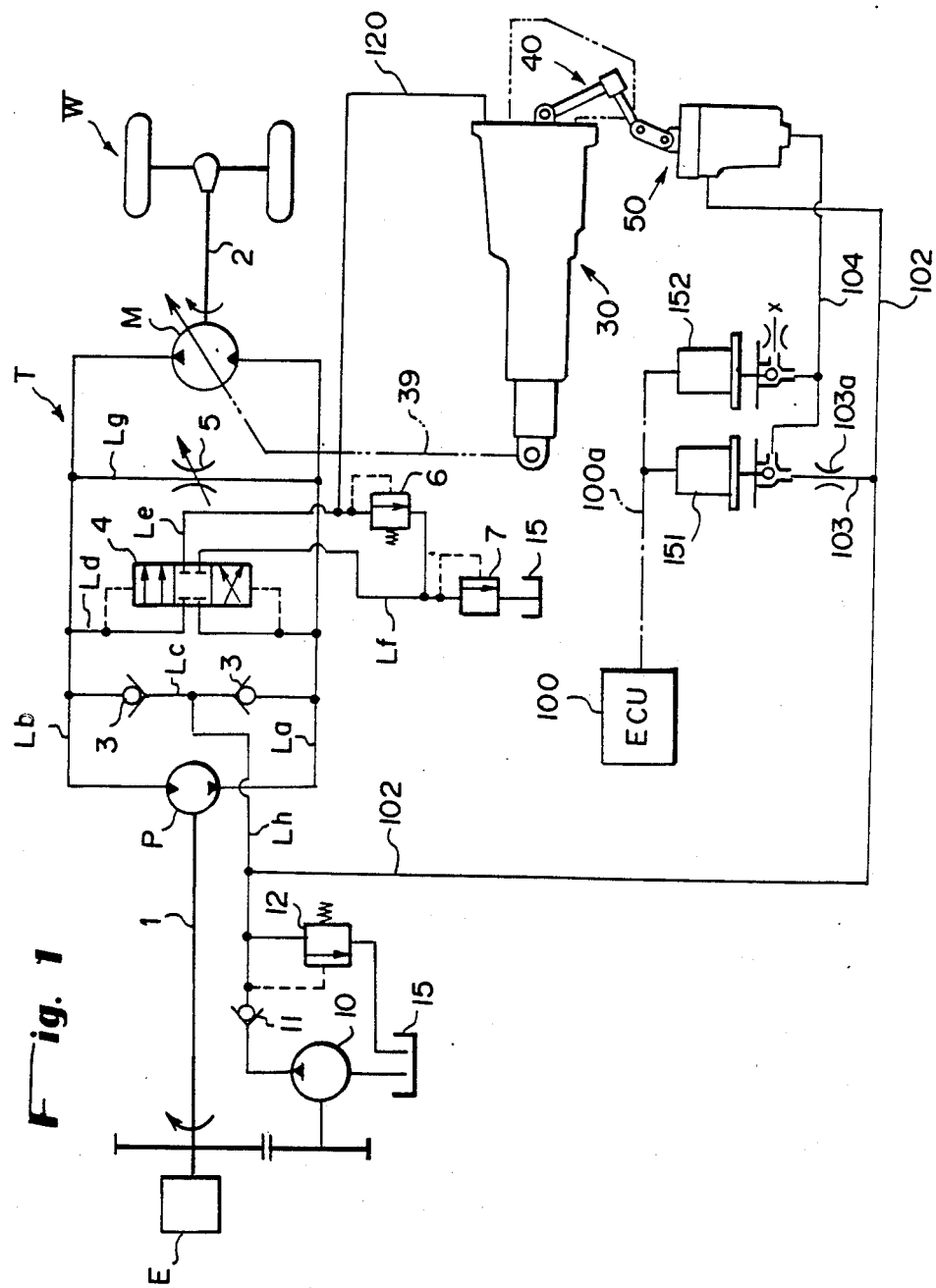
FIG. 1 is a diagram of a hydraulic circuit arrangement of a continuously variable speed transmission having a hydraulic servo cylinder device according to the present invention.

FIG. 1 shows a hydraulic circuit diagram of a continuously variable speed transmission provided with a hydraulic servo cylinder device, according to the present invention. The continuously variable speed transmission has a constant displacement hydraulic pump P driven by the engine E through the input shaft 1 and a variable displacement hydraulic motor M connected to the output shaft 2 driving the wheels W. The hydraulic pump P and motor M constitute a closed hydraulic circuit along with two hydraulic lines: the first hydraulic line La by which the delivery port of the pump P communicates with the suction port of the motor M, and the second hydraulic line Lb by which the suction port of the pump P communicates with the delivery port of the motor M.

A charge pump 10 driven by the engine E is connected to the closed circuit through a charge hydraulic line Lh having a check valve 11 and through a third hydraulic line Lc having a pair of check valves 3 and 3. Hydraulic oil pumped up by the charge pump 10 from an oil sump 15 and regulated its pressure by a charge pressure relief valve 12 is supplied to either of the two hydraulic lines La or Lb which has lower pressure through the check valves 3, 3. A fourth hydraulic line Ld having a shuttle valve 4 is connected to the closed circuit. To the shuttle valve 4 is connected a fifth and a sixth hydraulic line Le and Lf which respectively have a high pressure relief valve 6 and a low pressure relief valve 7 and with outlets to the oil sump 15. The shuttle valve 4 is a 2-port 3-position selector valve, which is operated in response to a hydraulic pressure difference between the first and second hydraulic lines La and Lb to shift to either ether of the extreme positions to connect either of the first or second hydraulic lines La, Lb having higher pressure to the fifth hydraulic line Le as well as to connect the other hydraulic line La or Lb having lower pressure to the sixth hydraulic line Lf. Therefore, the relief hydraulic pressure of a higher pressure line is regulated by the high pressure relief valve 6, and the relief hydraulic pressure of the other, lower pressure-side line is regulated by the low pressure relief valve 7. When the pressures in the hydraulic lines La and Lb are equal, the valve 4 is in the central position for closing the line Ld.

Between the first and second hydraulic lines La and Lb is provided a seventh hydraulic line Lg for selectively short-circuiting the two lines. The seventh hydraulic line Lg is provided with a clutch valve 5, which is a variable opening control valve to control the opening degree of the line. Therefore, the opening control of the clutch valve 5 can effect clutch control to control the transmission of driving force from the hydraulic pump P to the hydraulic motor M.

Actuators for displacement control of the hydraulic motor M to control a speed reduction ratio of the continuously variable speed transmission T are a first and a second ratio control servo unit 30, 50 which are connected with each other by means of a link mechanism 40. The hydraulic motor M is of a swash plate axial piston type, and its displacement is changed by the control of a swash plate angle bby means of the ratio control servo units 30, 50.

The operation of the ratio control servo units 30, 50 is controlled by solenoid valves 151, 152 which are duty-ratio-controlled by signals from a controller 100. The controller 100 receives signals corresponding to a vehicle speed V, an engine speed Ne, a throttle opening $\theta$th, a swash plate slant angle $\theta$tr of the hydraulic motor M, an accelerator pedal opening $\theta$acc operated by the driver, an atmospheric pressure Pat, a water temperature Tw, an oil temperature To, and a clutch opening $\theta$cl. Based on these signals, the controller 100 outputs signals for controlling the solenoid valves 151, 152 so as to effectuate desirable vehicle traveling controls.

The structures and operations of the above servo units 30, 50 are described in detail below based on FIGS. 1 and 2.

The first ratio control servo unit 30 controls the swash plate angle of the hydraulic motor M with the help of the high hydraulic pressure fed from the closed hydraulic circuit of the transmission T through the shuttle valve 4, the fifth line Le and a high pressure line 120. The second ratio control servo unit 50 (the hydraulic servo cylinder device), is connected to the first ratio control servo unit 30 by a link mechanism 40 and controls the operation of the first rato control servo unit 30.

The first ratio control serve unit 30 comprises a housing 31 having a connection port 31a connected to the high pressure line 120, a piston member 32 slidably inserted into the housing 31, and a spool member 34 slidably and coaxially inserted into the piston member 32. The piston member 32 consists of a piston portion 32a formed at its right end and a rod portion 32b coaxially extending leftward. The piston portion 32a fitted into a cylinder hole 31c of the housing 31 and divides the space inside the cylinder hole 31c into two chambers defining two cylinder chambers 35, 36. The rod portion 32b having a smaller diameter than that of the cylinder hole 31c is inserted into a rod hole 31d which is concentric with the cylinder hole 31c. The right cylinder chamber 36 is covered by a plug member 33a and cover 33b through which the right end of the spool member 34 protrudes.

The high pressure line 120 connected to the port 31a communicates with the left cylinder chamber 35 through a hydraulic line 31b. The piston member 32 is pushed rightward by the hydraulic pressure fed in the left cylinder chamber 35 through the high pressure line 120.

A land portion 34a which is inserted in a spool hole 32d is formed at the left end of the spool member 34. A pair of dents 34b with fixed axial widths is formed at the right side of the land portion 34a. A stop ring 37 mounted on the spool member 34 hits against a stop ring 38 mounted on the inside surface of the piston member 32 before the spool member 34 comes out.

A drain passage 32e which can connect the right cylinder chamber 36 to the oil sump (not shown) through the spool hole 32d responding to the rightward motion of the spool member 34 and a connection passage 32c which can connect the left cylinder chamber 35 to the right cylinder chamber 36 through the dents 34b responding to the leftward motion of the spool member 34 are formed in the piston member 32.

When the spool member 34 is moved rightward, the land portion 34a blocks the connection passage 32c and opens the drain passage 32e. Accordingly, the hydraulic pressure fed through the high pressure line 120 is led in the left cylinder chamber 35 and pushes the piston member 32 rightward so that the piston member 32 follows the spool member 34. When the spool member 34 is moved leftward, the connection passage 32c communicates with the right cylinder chamber 36 through the dents 34b and the drain passage 32e is blocked by the land portion 34a. Accordingly the high hydraulic pressure is fed to both the left and right cylinder chambers 35, 36. The piston member 32 is pushed leftward because of the difference in areas where pressure is applied and therefore the piston member 32 is moved so as to follow the spool member 34.

When the spool member 34 is held still, the piston member 32 is also held still creating a hydraulically balance state because of pressure balance between the left and right cylinder chambers 35, 36.

As discussed above when the spool member 34 is moved leftward or rightward, the piston member 32 is moved laterally so as to follow the spool member 34 with the help of the high hydraulic pressure fed through the high pressure line 120. Accordingly, the variable displacement of the motor M is controlled by the motion of the spool member 34 since the piston member 32 is connected to the swash plate 73 of the motor M by means of a link member 39. The spool member 34 is linked to the second servo unit 50 by means of a link mechanism 40. The link mechanism 40 includes a first link member 42 being swingable around an axis 42c and having two arms 42a and 42b perpendicular to each other, and a second link member 48 pivotally connected to the arm 42b. The upper end of the arm 42a is pivotally connected to the right end of the spool member 34. The bottom end of the second link member 48 is pivotally connected to a spool member 54 of the second servo unit 50. Therefore when the spool member 54 of the second servo unit 50 is moved up or down, the spool member 34 of the first servo unit 30 is moved rightward or leftward.

Figure 2:
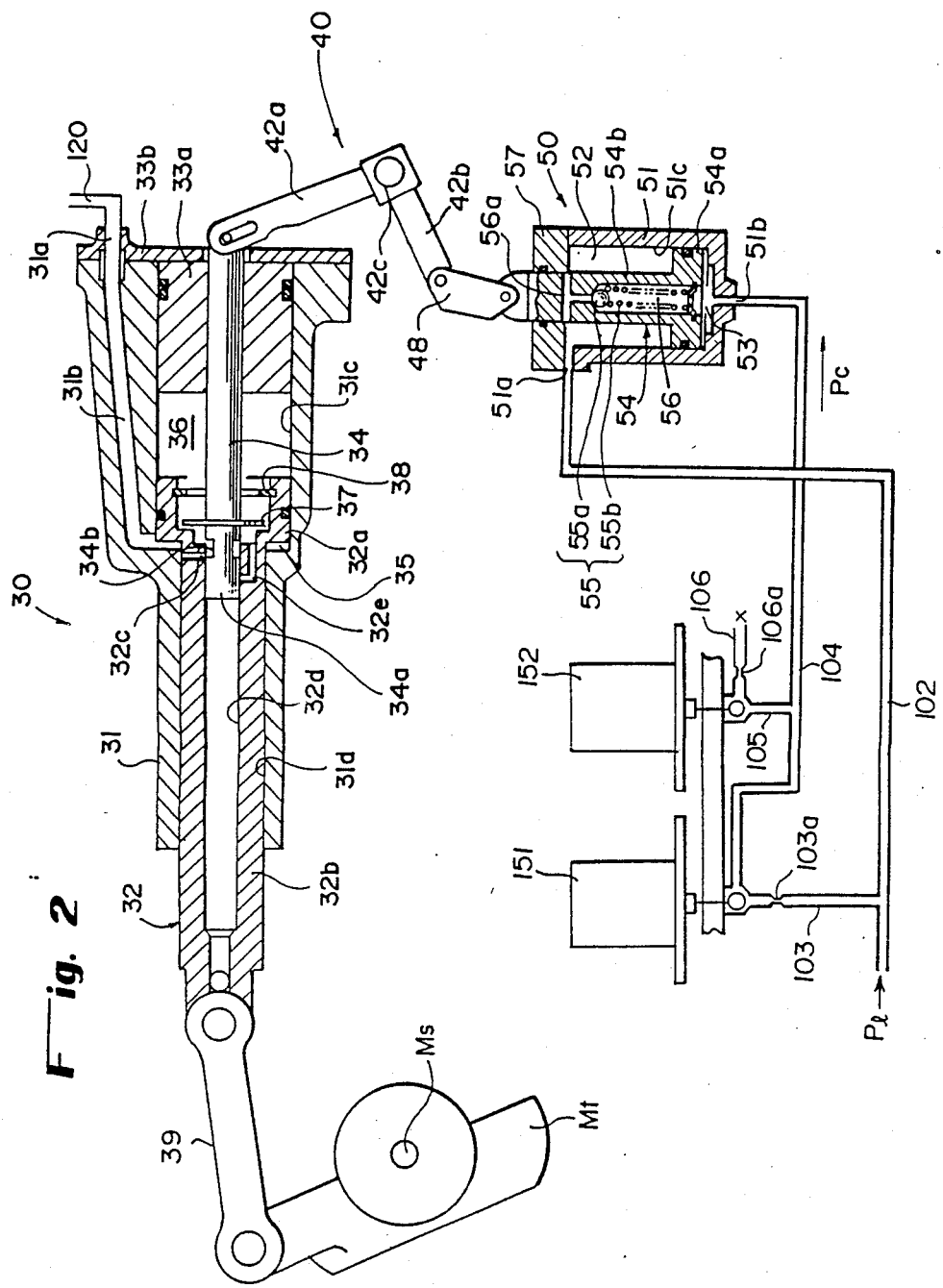
FIG. 2 is a cross-sectional view of the hydraulic servo cylinder device.

The second servo unit 50 comprises a housing (cylinder) 51 having ports 51a, 51b connected to two hydraulic pressure lines 102, 104, respectively, and piston member 54 fitted in the housing 51 for vertical sliding movement therein (FIG. 2). The piston member 54 comprises a piston 54a and a rod 54b extending concentrically upwardly from the piston 54a. The piston 54a is fitted in a cylinder bore 51c defined vertically in the housing 51, and divides the cylinder chamber of the housing 51 covered with a cover 57 into a rod-side cylinder chamber 52 through which the rod 54b extends and a head-side cylinder chamber 53 into which the head surface (lower surface as shown) of the piston 54a faces. The piston member 54 has a communication passage 56 defined therethrough and having in its upper end an opening 56a which communicates with the rod-side cylinder chamber 52 when the piston member 54 is moved to a position near a head-side stroke end thereof, i.e., a lower limit position as shown. The communication passage 56 extends axially downwardly through the piston member 54 and opens into the head-side cylinder chamber 53. In the communication passage 56, there is disposed a check valve 55 comprising a ball 55a and a spring 55b for allowing working oil to flow only from the rod-side cylinder chamber 52 toward the head-side cylinder chamber 53.

The hydraulic pressure lines 102, 104 communicate respectively with the rod-side cylinder chamber 52 and the head-side cylinder chamber 53 through respective ports 51a, 51b. The piston member 54 is vertically movable dependent in the hydraulic pressures of working oil supplied via the hydraulic pressure lines 102, 104 and also on the difference between hydraulic forces acting on the piston 54a which are determined by pressure-bearing surfaces of the piston 54a within the cylinder chambers 52, 53. Vertical movement of the piston member 54 is transmitted through the link mechanism 40 to the spool 34 of the first servo valve 30 for horizontally moving the spool 34. In other words, the control of the hydraulic pressures supplied through the hydraulic lines 102, 104 enables control of the motion of the spool member 34 and the piston member 32 in the first servo unit 30 and also enables control of the swash plate angle of the hydraulic motor M and the displacement thereof. In fact, when the piston member 54 of the second servo unit 50 is moved up, the piston member 32 of the first servo unit 30 is moved rightward lessening the swash plate angle, the displacement of the hydraulic motor M and the speed reduction ratio.

The pressurized oil in the hydraulic line 102 connecting the port 51a with the rod-side cylinder chamber 52 is sent from the delivery line of the charge pump 10 after its pressure is regulated by the charge pressure relief valve 12. The oil pressure in the hydraulic line 104 connecting the port 51b with the head-side cylinder chamber 53 is obtained by regulating the oil pressure in a hydraulic line 103 (in267 therein), which is branched from the hydraulic line 102, by the first and second duty-ratio-controlled solenoid valves 151 and 152. The first solenoid valve 151 duty-ratio-controls the flow rate of the oil flowing from the hydraulic line 103 (having the orifice 103a therein) to the hydraulic line 104. The second solenoid valve 152 is disposed between a hydraulic line 105 branched from the line 104 and a hydraulic line 106 communicating with the drain through an orifice 106a, and duty-ratio-controls drain-flow of the hydraulic oil from the line 104 in accordance with a given duty ratio.

As a result, to the rod-side cylinder chamber 52, line pressure (charge pressure) Pl regulated by the charge pressure relief valve 12 is applied through the line 102, while to the head-side cylinder chamber 53 is supplied from the line 104 control pressure Pc which is regulated by the first and second solenoid valves 151 and 152 and is lower than the charge pressure. In this connection, since the pressure applied area of the rod-side cylinder chamber 52 is smaller than that of the head-side cylinder chamber 53, the forces of hydraulic pressures in the cylinder chambers 52 and 53 acting on the piston member 54 keep their balance when the hydraulic pressure in the head-side cylinder chamber 53 is a specified value Pe which is smaller than the oil pressure Pl in the rod-side cylinder chamber 52 (Pl > Pe). Therefore, when the control pressure Pc supplied into the head-side cylinder chamber 53 from the line 104 is controlled by the first and second solenoid valves 151 and 152 so as to be greater than the above pressure Pe, the spool member 54 is moved upward to yield a small swash plate angle of the hydraulic motor M, i.e., to have a small speed reduction ratio, while when the oil pressure supplied into the lower cylinder chamber 53 from the line 104 is controlled so as to be smaller than the above pressure Pe, the spool member 54 is moved downward to yield a large swash plate angle of the hydraulic motor M, i.e., to have a large speed reduction ratio.

When the solenoid-operated valves 151, 152 are closed to reduce the hydraulic control pressure Pc to zero for a maximum transmission ratio, the piston member 54 is moved downwardly toward the lower limit position under the line pressure Pl acting in the rod-side cylinder chamber 52. When the piston member 54 reaches a position near the lower limit position, the upper end opening 56a of the communication passage 56 defined in the piston member 54 communicates with the rod-side cylinder chamber 52, as shown in FIG. 2. Therefore, the line pressure Pl in the rod-side cylinder chamber 52 is supplied into the head-side cylinder chamber 53 through the check valve 55 in the communication passage 56. The hydraulic pressure Pl in the head-side cylinder chamber 53 rises thereby to apply a hydraulic force to the piston member 54 to move the latter upwardly. Upon upward movement of the piston member 54, the opening 56a is displaced out of communication with the rod-side cylinder chamber 52. Consequently, the hydraulic pressure in the head-side cylinder chamber 53 is finally held at a pressure level Pe which balances with the hydraulic force in the rod side cylinder chamber 52. The piston member 54 is thus not completely displaced downwardly but is maintained at a position slightly above the lower limit position, keeping the hydraulic pressure Pe in the head-side cylinder chamber 53 and the hydraulic pressure line 104.

For varying the transmission ratio, the solenoid operated valves 151, 152 are actuated to exert the hydraulic control pressure Pc through the hydraulic pressure line 104 into the head-side cylinder chamber 53. Since the working oil in the hydraulic pressure line 104 and the head-side cylinder chamber 53 are kept unfer the hydraulic pressure Pe, as described above, the hydraulic pressure in the head-side cylinder chamber 53 can be switched, without a response delay, to the hydraulic control pressure Pc and applied to the piston member 54. Accordingly, the response of operation of the piston member 54 of the second servo valve 50 to a speed-change command applied to the solenoid-operated valves 151, 152 is high.

By holding the piston member 54 in a position slightly above the lower limit position, rather than completely lowering the piston member 54, and play developed in the link mechanism 45 can be absorbed, and any ineffective stoke is eliminated which would otheriwse be produced by any play of the link mechanism 45 upon initial movement of the piston member 54, so that any response delay due to such ineffective stroke can be prevented.

Figure 3:
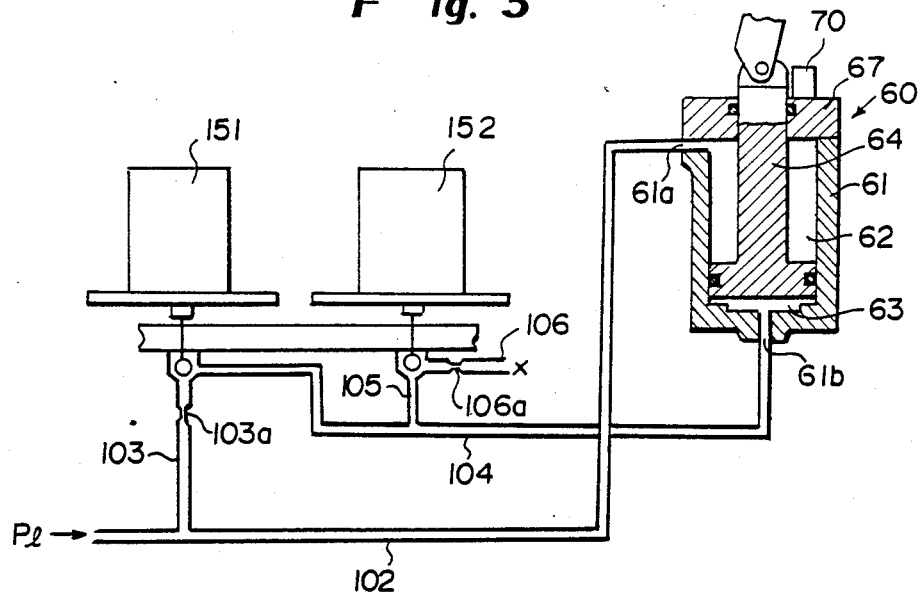
FIGS. 3 and 4 are cross-sectional views of other hydraulic servo cylinder devices according to the present invention.
Figure 4:
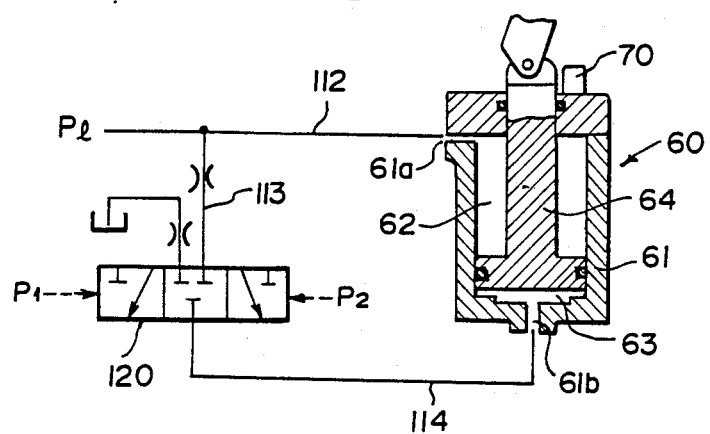

FIGS. 3 and 4 also show other arrangements for holding the piston member in a position slightly above the lower limit position to prevent a response delay upon an increase in the control hydraulic pressure and also to absorb any play of the link mechanism.

In FIG. 3, a second servo unit or cylinder device 60 comprises a housing 61 and a piston member 64. The piston member 64 does not have counterparts of the check valve 55 and the communication passage 56 shown in FIG. 2. The piston member 64 divides the interior of the housing 61 into cylinder chambers 62, 63 connected to respective hydraulic pressure lines 102, 104 through respective ports 61a, 61b. The hydraulic pressure lines 102, 104 are supplied with a line pressure Pl and a control pressure Pc which is controlled by two solenoid-operated valves 151, 152 in the same manner as shown in FIG. 2. To the cylinder device 60, there is attached a position sensor 70 for detecting the position of the piston member 64. The position sensor 70 detects when the piston member 64 is lowered to a position near its lower limit position for a maximum transmission ratio. In response to a detected signal from the position sensor 70, a controller actuates the solenoid-operated valves 151, 152 to keep the working oil in the head-side cylinder chamber 63 under a hydraulic pressure Pe to hole the piston member 64 in the position slightly above the lower limit position. The arrangement shown in FIG. 3 is thus as advantageous as the embodiment of FIG. 2 in that it can prevent any response delay upon a buildup of the hydraulic control pressure and absorb any play of the link mechanism.

FIG. 4 shows an arrangement which is of the same priniciple as that of FIG. 3. In order to maintain the oil in the head-side cylinder chamber 63 at the hydraulic pressure Pe, a three-port two-position valve 120 which can be operated by two pilot hydraulic pressures P1, P2 is employed in place of the solenoid-operated valves.

In the aforesaid embodiments, as described above, the communication passage is provided for supplying the line pressure from the rod-side cylinder chamber to the head-side cylinder chamber through the check valve when the piston is moved to a position near the head-side stroke end, and the duty-ratio controlling solenoid-operated valves or the three-port two-position valve is provided for controlling the hydraulic pressure to be supplied to the head-side cylinder chamber. Therefore, when the piston is positioned near the head-side stroke end, the working oil in the head-side cylinder chamber can be maintained under a prescribed hydraulic pressure Pe in order to place in equilibrium the hydraulic forces acting in the respective cylinder chambers on the piston. Consequently, when moving the piston from the condition in which the control hydraulic pressure is zero, the response of the piston at an initial period of movement thereof is improved.

By holding the piston in the position slightly displaced from the stroke end, any play of the link mechanism coupled to the piston for transmitting movement of the piston can be absorbed, and any response delay which would otherwise be caused by such play can be prevented.

The invention being thus described, it will be obvious that the same may be varied in many ways. Such variations are not to be regarded as a departure from the spirit and scope of the invention, and all such modifiations as would be obvious to one skilled in the art are intended to be included within the scope of the following claims.

What is claimed is:

1. A hydraulic servo cylinder for controlling a speed reduction ratio or a clutch operation in a continuously variable transmission capable of continuously varying the speed of input rotation, comprising a cylinder and a piston slidably fitted in a cylinder chamber defined in said cylinder, said cylinder chamber being divided by said piston into a rod-side cylinder chamber through which a piston rod extends, and a head-side cylinder chamber into which a piston head surface faces, said rod-side cylinder chamber being supplied with a hydraulic line pressure, said head-side cylinder chamber being supplied with a hydraulic control pressure for slidably moving said piston against said line pressure, characterized in that when said piston is moved to a position near a head-side stroke end, the control pressure in said head-side cylinder chamber is so set that a hydraulic force which said piston receives from said control pressure in said head-side cylinder chamber is in equilibrium with a hydraulic force which said piston receives from said line pressure in said rod-side cylinder chamber, wherein said piston has a communication passage having one end which opens into said rod-side cylinder chamber when said piston is moved to the position near the head-side stroke end, and an opposite end which normally opens into said head-side cylinder chamber, and a check valve disposed in said communication passage for allowing a flow only from said rod-side cylinder chamber to said head-side cylinder chamber, the arrangement being such that when said piston is moved to the position near the head-side stroke end, the line pressure is supplied from said rod-side cylinder chamber to said head-side cylinder chamber through said communication passage to control the control pressure in said head-side cylinder chamber so that a hydraulic force which said piston receives from said control pressure in said head side cylinder chamber balances with a hydraulic force which said piston receives from said line pressure in said rod-side cylinder chamber.

2. A hydraulic servo cylinder for use in a continuously variable tranmission, comrpising a cylinder chamber defined in said cylinder, said cylinder chamber being divided by a piston into a rod-side cylinder chamber through which a piston rod extends, and a head-side cylinder chamber into which a piston head surface faces, said rod-side cylinder chamber being supplied with a hydraulic line pressure, said head-side cylinder chamber being supplied with a hydraulic control pressure for slidably moving said piston against said line pressure, a communication passage having one end which opens into said rod-side cylinder chamber when said piston is moved to a position near a head-side stroke end and an opposite end which normally opens into said head-side cylinder chamber, and a check valve disposed in said communication passage for allowing a flow of hydraulic fluid only from said rod-side cylinder chamber to said head-side cylinder chamber, the arrangement being such that when said piston is moved to the position neqar the head-side stroke end, the line pressure is supplied from said rod-side cylinder chamber to said head-side cylinder chamber through said commmunciation passage to control the control pressure in said head-side cylinder chamber so that a hydraulic force which said piston receives from said control pressure in said head side cylinder chamber balances with a hydraulic force which said piston receives from said line pressure in said rod-side cylinder chamber.

* * * * *